United States Patent [19]
Stephenson

[11] 3,820,842
[45] June 28, 1974

[54] SLIP TONGUE WITH INFLATOR BAND

[75] Inventor: Robert L. Stephenson, Sterling Heights, Mich.

[73] Assignee: Allied Chemical Corporation, New York, N.Y.

[22] Filed: Nov. 17, 1972

[21] Appl. No.: 307,703

[52] U.S. Cl...... 297/389, 280/150 AB, 280/150 SB, 297/388, 297/390
[51] Int. Cl............................................. A62b 35/00
[58] Field of Search ........... 297/384, 385, 386, 387, 297/388, 389, 390; 280/150 SB, 150 AB

[56] References Cited
UNITED STATES PATENTS

| 2,726,714 | 12/1955 | McAndrews | 297/387 |
| 2,899,146 | 8/1959 | Barecki | 297/389 |
| 3,146,460 | 9/1964 | Henderson | 280/150 AB |
| 3,430,979 | 3/1969 | Terry et al. | 280/150 AB |
| 3,706,463 | 12/1972 | Lipkin | 280/150 AB |

Primary Examiner—James T. McCall
Attorney, Agent, or Firm—Jonathan Plaut

[57] ABSTRACT

An inflatable band restraint system mounted to a strap structure which is in turn movably mounted on a tongue for reception in a buckle for positioning of the inflatable band restraint on an occupant.

6 Claims, 4 Drawing Figures

PATENTED JUN 28 1974          3,820,842

SLIP TONGUE WITH INFLATOR BAND

This application is related to provisions of adjustable structure for use with an inflatable band restraint for occupant restraint in a vehicle. More particularly in one embodiment the invention is related to provisions of a tongue means which lock in a seat belt buckle and which is connected to an inflatable band restraint for occupant restraint in such a way as to allow the inflatable band restraint to be movable in its position on inflation.

It is well known in the prior art to provide a single unitary or connected restraint which crosses both the upper torso and the lap of the occupant of a vehicle to maintain that occupant in a safe position in case of an accident. Such a device is shown, for example, in the patent to Radke, U.S. Pat. No. 3,542,426. Further it is known in the prior art to provide for an inflatable band restraint, see for example, U.S. patent application Ser. No. 290,917 filed Sept. 21, 1972. This invention is directed toward provision of an inflatable restraint for upper torso alone or with lap protection, with said inflatable restraint being simply and effectively adjustable in position on the occupant before and on inflation.

Generally, the invention is concerned with an occupant restraint system comprising an inflatable band in uninflated condition and positioned across an occupant of a vehicle with means for supplying inflating gas to said band for inflation thereof. Inflating gas flows from said means to said inflatable band for inflation thereof on deacceleration sensing. Webbing means is connected to said inflatable band, and a tongue for reception in a seat belt buckle is slideably mounted on said webbing. Reception of the tongue in the vehicle mounted buckle positions said inflatable band across the occupant, said inflatable band being positioned at its ends by connecting structure to the vehicle.

The invention will now be described in more detail with relation to the following drawings.

Figure 1:
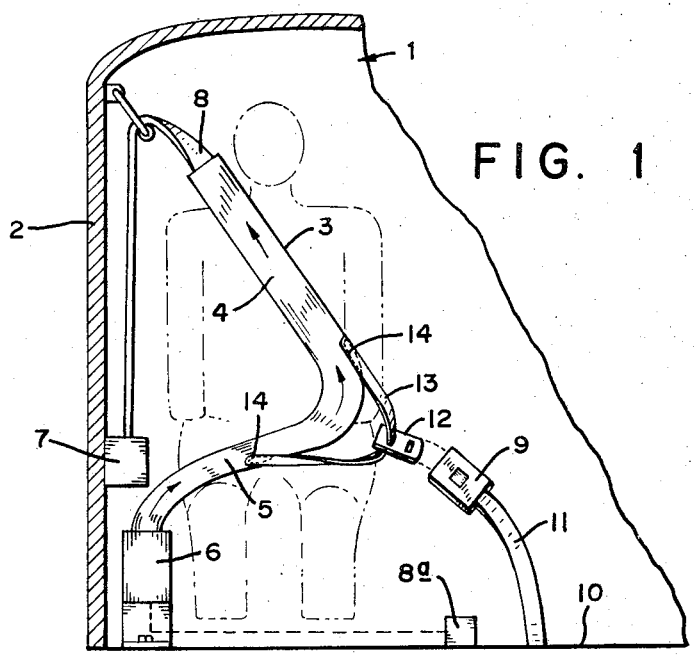
FIG. 1 shows one embodiment of the restraint schematically shown as mounted in a vehicle.

Referring to the drawing, in FIG. 1, a vehicle 1 is shown schematically with an inflatable band restraint 3 mounted on a side post 2 thereof for occupant protection. The occupant is shown in phantom in the drawing.

The inflatable restraint is structured as an upper torso protecting section 4 and a lap protecting section 5, and is comprised of a woven nylon tube, in one embodiment, which is expanded from a folded condition by gas supplied from an inflator gas source 6. One specific form of an inflatable band restraint is described in previously referred to U.S. application.

In one embodiment, as is well known in the art, the inflatable band restraint 3 is connected to retractor 7 mounted on the vehicle side post from its upper end 8 thereof, so that the inflatable band will be in stored position against the side of the vehicle when not in use, as is well known. The inflatable band restraint in its uninflated condition is folded and held (as by stitching) in the folded orientation so as to act in the place of, and as a seat belt. In the event of conditions which will present injury to the occupant, such as rapid deacceleration or accident, a vehicle sensitive inertia sensor 8a will signal the inflator 6 to supply inflating gas to the inflatable band restraint 3 to hold the occupant in his position in his seat.

The inflatable band restraint 3 is connected by tongue 12 to seat belt buckle 9, for example, a push button buckle such as that described in the U.S. Pat. to Lohr, No. 3,522,640, which in one embodiment attached to the vehicle floor 10 by a cable 11, to hold the inflatable band restraint in its position across the torso and the lap of the occupant. The tongue 12 is slideably attached to the loop or webbing 13, which is in turn attached to the restraint 3, as by, for example, stitching 14 or adhesive, or other suitable attaching means. The loop 13 may be made of nylon or other flexible material and, as may be seen in FIG. 3, is run through an opening 15 in the tongue 12 so that the tongue is freely movable with relation to the loop and in this embodiment, to the inflatable band restraint.

Figure 2:
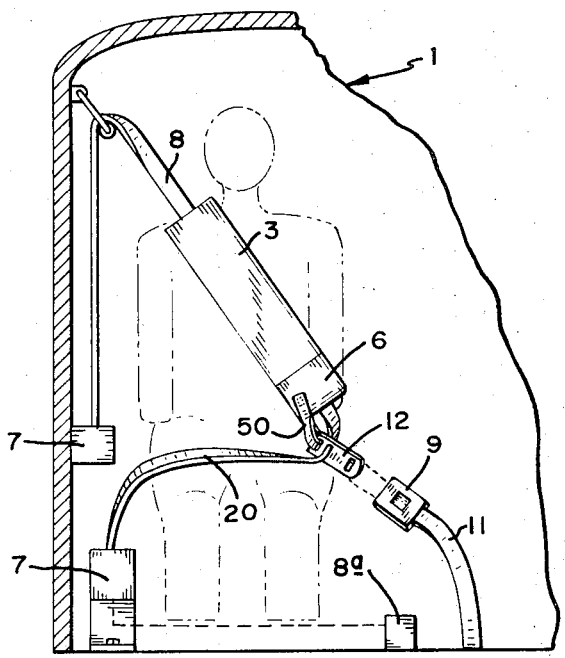
FIG. 2 shows a second embodiment.

In FIG. 2 a like construction is shown and similar numerals are used to identify the same structure in both FIGS. 1 and 2. In this embodiment, however, the inflatable band restraint 3 contains within it the inflator means 6 and inflatable band restraint only provides upper torso protection, with the lap area being protected by a standard seat belt webbing 20 which is attached to the inflatable band restraint. The seat belt buckle tongue 12, in this embodiment, is attached to the seat belt webbing 20 with the sliding arrangement described in FIG. 3.

The sensor 8a in FIG. 2 may be an electrical connected through the webbing to the inflator means 6 for inflating the band restraint 3. Also, a retractor 7 may be connected to the lap webbing as well as the upper part of the inflatable restraint.

Figure 3:
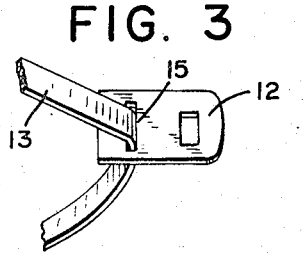
FIG. 3 shows the connection of the tongue plate to the inflatable restraint.
Figure 4:
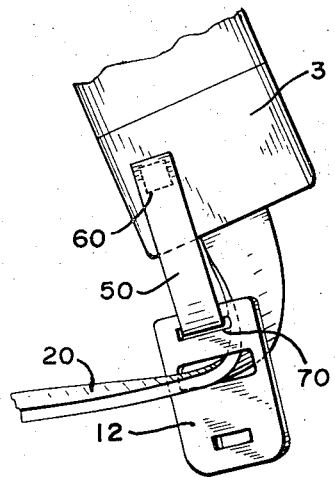
FIG. 4 shows an illustrative detail.

The tongue 12 in one embodiment may be attached, as by sewing, in a breakaway connection by member 50 such as webbing, for example, to the inflatable band restraint (see FIGS. 3 and 4). In FIG. 4 the member 50 is sewn with a breakaway box stitching 60 to the member 3 and passed through opening 70 and sewn on itself. Although it (the tongue) is then adjustable on the belt 20, it may fix the restraint 3 in the correct position before inflation across the chest of the occupant. In the event of inflation of the uninflated folded inflatable restraint 3, the member 50 breaks away from either the tongue 12 or the band 3 to allow the band to inflate and position the occupant against the seat.

Having described the invention in detail with relation to specific embodiments which are presented to illustrate applicant's invention, applicant hereby claims the following:

1. Occupant restraint system comprising an inflatable band in uninflated condition and positioned at least across the chest position of an occupant of a vehicle, means for supplying inflating gas to said band for inflation thereof, means sensitive to deacceleration of the vehicle for causing said inflatable gas to flow from said means to said inflatable band for inflation thereof, webbing means connected to said inflatable band, a tongue freely slideably mounted on said webbing for reception in a seat belt buckle, said buckle mounted on the vehicle and positioning said inflatable band across the occupant when said tongue is mounted in the buckle, said inflatable band being positioned at its ends by connecting structure to the vehicle.

2. Apparatus as set forth in claim 1, said webbing affixed to said inflatable band and said inflatable band extending across both the chest and lap positions of the occupant.

3. Apparatus as set forth in claim 2, said inflatable band retained at at least one of its ends by a retracting device mounted on the vehicle.

4. Occupant restraint system comprising an inflatable band in uninflated condition and positioned across an occupant of a vehicle, means for supplying inflating gas to said band for inflation thereof, means sensitive to deacceleration of the vehicle for causing said inflatable gas to flow from said means to said inflatable band for inflation thereof, webbing means connected to said inflatable band, a tongue freely slideably mounted on said webbing for reception in a seat belt buckle, said buckle mounted on the vehicle and positioning said inflatable band across the occupant when said tongue is mounted in the buckle, said inflatable band being positioned at its end by connecting structure to the vehicle, said tongue further directly attached to said inflatable band by a tearaway mounting which allows separation of the tongue from said band on inflation of the band.

5. An apparatus as set forth in claim 1 further comprising disposition of the inflatable band only across the chest position of the occupant with said webbing extending across the lap position.

6. An apparatus as set forth in claim 5 the end of said inflatable band not connected to the webbing and the end of the webbing not connected to the inflatable band being mounted on retracting devices mounted on the vehicle.

* * * * *